US012562634B2

(12) United States Patent (10) Patent No.: US 12,562,634 B2
Kleine et al. (45) Date of Patent: Feb. 24, 2026

(54) PHASE ADDITION IN POWER CONVERTERS

(71) Applicant: Renesas Electronics America Inc., Milpitas, CA (US)

(72) Inventors: John Stuart Kleine, Cary, NC (US); Yashovardhan Rao Potlapalli, Cary, NC (US); Michael Jason Houston, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 188 days.

(21) Appl. No.: 18/591,469

(22) Filed: Feb. 29, 2024

(65) Prior Publication Data

US 2024/0297571 A1     Sep. 5, 2024

Related U.S. Application Data

(60) Provisional application No. 63/488,340, filed on Mar. 3, 2023.

(51) Int. Cl.
H02M 1/08 (2006.01)
H02M 1/00 (2006.01)
(Continued)

(52) U.S. Cl.
CPC ....... H02M 1/0845 (2013.01); H02M 1/0025 (2021.05); H02M 3/1586 (2021.05)

(58) Field of Classification Search
CPC .... H02M 3/1582; H02M 3/156; H02M 3/157; H02M 3/158; H02M 3/1584; H02M 3/1586; H02M 3/285; H02M 3/33561;

H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084;
(Continued)

(56) References Cited

U.S. PATENT DOCUMENTS 8,878,501 B2 * 11/2014 Kalje .................. H02M 3/1584
                                                   323/272
10,498,237 B1 * 12/2019 Lin ...................... H02M 3/158
(Continued)

*Primary Examiner* — Jeffrey A Gblende
(74) *Attorney, Agent, or Firm* — SCULLY, SCOTT, MURPHY & PRESSER, P.C.

(57)     ABSTRACT

System and methods for a power converter are described. A controller can generate first clock signals and generate pulse width modulation (PWM) signals using the first clock signals to operate a first number of active phases in a power converter to supply power to a load. The controller can determine the load demands a second number, greater than the first number, of active phases to supply the power. The controller can generate pulse signals and combine the pulse signals with the first clock signals to generate second clock signals having a higher frequency than the first clock signals. The controller can generate the PWM signals using the second clock signals to operate the second number of active phases in the power converter to supply power to the load.

20 Claims, 5 Drawing Sheets

(51) Int. Cl.
  *H02M 1/084*   (2006.01)
  *H02M 3/158*   (2006.01)

(58) Field of Classification Search
  CPC .. H02M 1/0845; H02M 1/007; H02M 1/0009;
     H02M 1/0095; H02M 1/08; H02M 1/088;
      H02M 3/1588; H02M 7/5395; H02M
       1/14; H02M 1/0043; H02M 1/0074;
      H02M 1/0077; H02M 1/0045; H02M
        1/0006; H02J 3/46; H02J 3/38
  See application file for complete search history.

(56)        References Cited

U.S. PATENT DOCUMENTS

2009/0058379 A1 * 3/2009 Sreenivas ........... H02M 3/1588
                323/241
2020/0321872 A1 * 10/2020 Upadhyaya ........... H02M 3/157

* cited by examiner

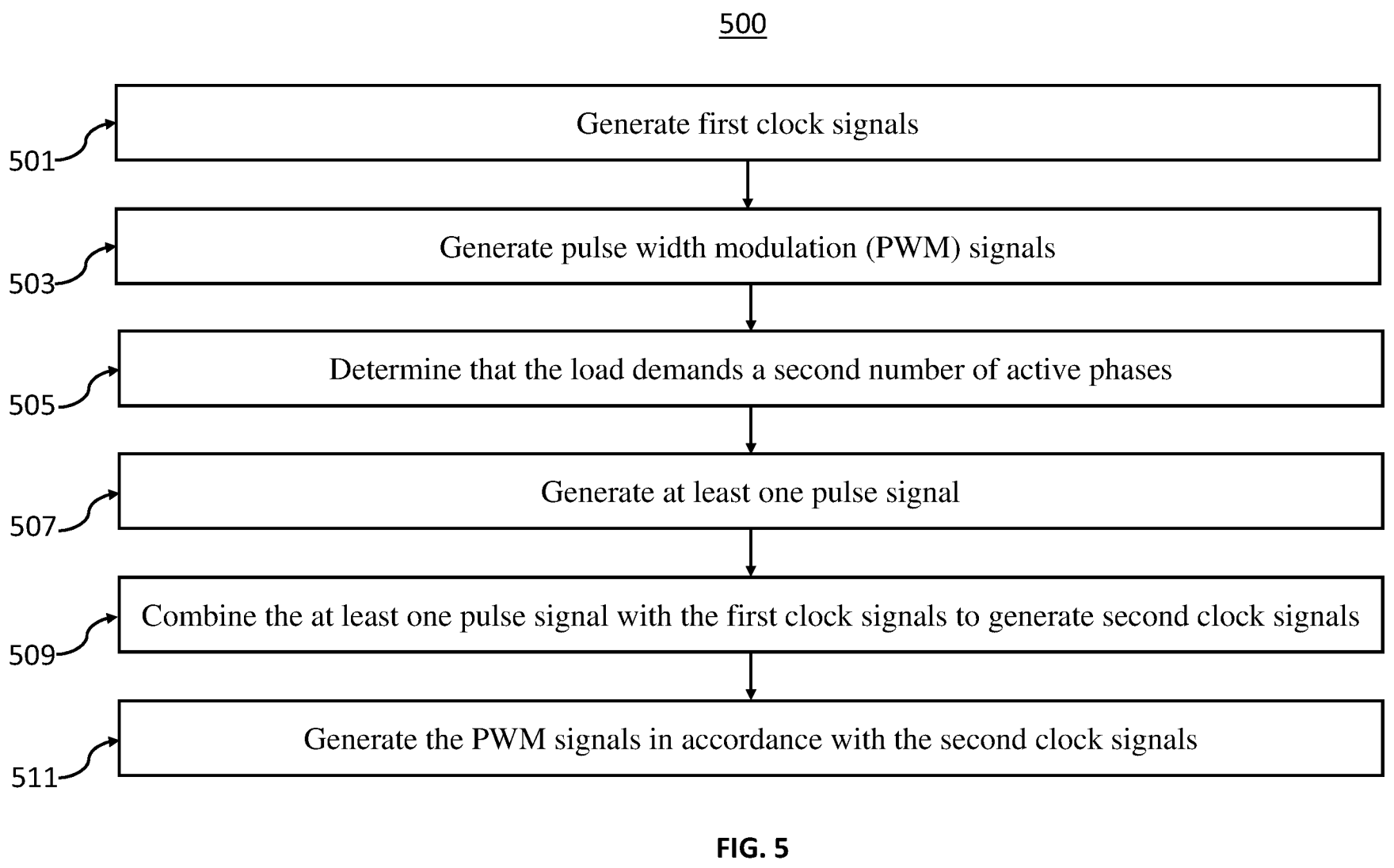

500

501   Generate first clock signals

503   Generate pulse width modulation (PWM) signals

505   Determine that the load demands a second number of active phases

507   Generate at least one pulse signal

509   Combine the at least one pulse signal with the first clock signals to generate second clock signals 511   Generate the PWM signals in accordance with the second clock signals

FIG. 5

PHASE ADDITION IN POWER CONVERTERS

CROSS-REFERENCE TO RELATED APPLICATION

This application is based upon and claims the benefit of priority under 35 USC 119(e) to U.S. Patent Application No. 63/488,340 filed on Mar. 3, 2023, and titled "FAST CLOCK AND PHASE ADD SYSTEM FOR MULTIPHASE VOLT-AGE REGULATORS," the entire disclosure of which is incorporated herein by reference in its entirety.

BACKGROUND

Unless otherwise indicated herein, the materials described in this section are not prior art to the claims in this application and are not admitted to be prior art by inclusion in this section. The present disclosure relates in general to systems and methods of controlling semiconductor devices, more particularly, to control of a power converter.

Power converters or voltage converters, such as buck converters and boost converters, can be used for converting an input voltage to an output voltage having a different voltage level. A buck converter, or step-down converter, can convert the input voltage into a lower voltage. A boost converter, or step-up converter, can convert the input voltage into a higher voltage. A buck-boost converter can step up or step down the input voltage. A voltage converter can include multiple switches that can be turned on and off by a pulse width modulated (PWM) control signal. A duty cycle of the PWM control signal can determine an output voltage of the voltage converter. When the voltage converter is connected to a load, the load can demand a specific amount of power and the voltage converter can perform the voltage conversion to generate the output voltage that can deliver the power demanded by the load.

SUMMARY

In one embodiment, a semiconductor device that can implement a phase addition in power converters is generally described. The semiconductor device can include a clock generator configured to generate first clock signals. The semiconductor device can further include a modulator configured to generate pulse width modulation (PWM) signals in accordance with the first clock signals to operate a first number of active phases in a multiphase power converter to supply power to a load. The semiconductor device can further include a circuit configured to determine that the load demands a second number of active phases in the multiphase power converter to supply the power. The second number can be greater than the first number. The circuit can be further configured to generate at least one pulse signal. The circuit can be further configured to send the at least one pulse signal to the clock generator. The clock generator can be further configured to combine the at least one pulse signal with the first clock signals to generate second clock signals. The second clock signals can have a higher frequency than the first clock signals. The modulator can be further configured to generate the PWM signals in accordance with the second clock signals to operate the second number of active phases in the multiphase power converter to supply power to the load.

In one embodiment, a system that can implement a phase addition in power converters is generally described. The system can include a multiphase power converter configured to convert an input voltage into an output voltage to supply power to a load. The system can further include a controller configured to generate first clock signals. The controller can be further configured to generate pulse width modulation (PWM) signals in accordance with the first clock signals to operate a first number of active phases in the multiphase power converter to supply power to a load. The controller can be further configured to determine that the load demands a second number of active phases in the multiphase power converter to supply the power. The second number can be greater than the first number. The controller can be further configured to generate at least one pulse signal. The controller can be further configured to combine the at least one pulse signal with the first clock signals to generate second clock signals, The second clock signals can have a higher frequency than the first clock signals. The controller can be further configured to generate the PWM signals in accordance with the second clock signals to operate the second number of active phases in the multiphase power converter to supply power to the load.

In one embodiment, a method that can implement a phase addition in power converters is generally described. The method can include generating first clock signals. The method can further include generating pulse width modulation (PWM) signals in accordance with the first clock signals to operate a first number of active phases in a multiphase power converter to supply power to a load. The method can further include determining that the load demands a second number of active phases in the multiphase power converter to supply the power. The second number can be greater than the first number. The method can further include generating at least one pulse signal. The method can further include combining the at least one pulse signal with the first clock signals to generate second clock signals. The second clock signals can have a higher frequency than the first clock signals. The method can further include generating the PWM signals in accordance with the second clock signals to operate the second number of active phases in the multiphase power converter to supply power to the load.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 5 is a flow diagram illustrating a method for phase addition in power converters, in accordance with various embodiments.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

A power converter can include power devices, such as field-effect transistors (FETs), that can be switched to generate output voltages for supplying power to a load. A controller of the power converter can include modulators configured to generate pulse-width-modulation (PWM) signals. The power converter can also include driver circuits that can receive the PWM signals and generate voltage signals using the PWM signals. The driver circuits can drive the power devices by applying the voltage signals to the gate terminals of the power devices to switch the power devices on and off. In an aspect, input voltage being provided to the power converter can have a voltage that is higher than the voltage of the power being demanded by the load. The power converter, which can be a buck converter, can step down the input voltage to generate an output voltage that has a voltage level being demanded by the load.

In an aspect, a power converter can be connected to different loads that demand different levels of power. A heavy load can demand relatively more power and a light load can demand relatively less power. The power converter can be designed and configured to supply different levels of power to accommodate heavy and light loads. The switching of the power devices can be controlled for the power converter to supply different amount of power to different loads. In an aspect, if a power converter is designed and configured for light loads, then the power converter may not be able to supply heavy loads. If the power converter is designed and configured for heavy loads, then the power converter can supply both heavy and light loads since the power devices can be controlled in specific ways to generate lower voltage for the light loads.

For example, the power converter can include multiple phases (e.g., driver ICs connected to power FETs). The multiple phases can be connected in parallel to deliver different levels of power, and also high power for heavy loads, in a relatively efficient manner. The controller of the power converter can manage the number of active phases based on the load to make the power conversion as efficient as possible. For example, the controller can activate more phases to supply power to a heavy load, and an activate fewer phases, or even only one phase, to supply power to a light load.

Figure 1:
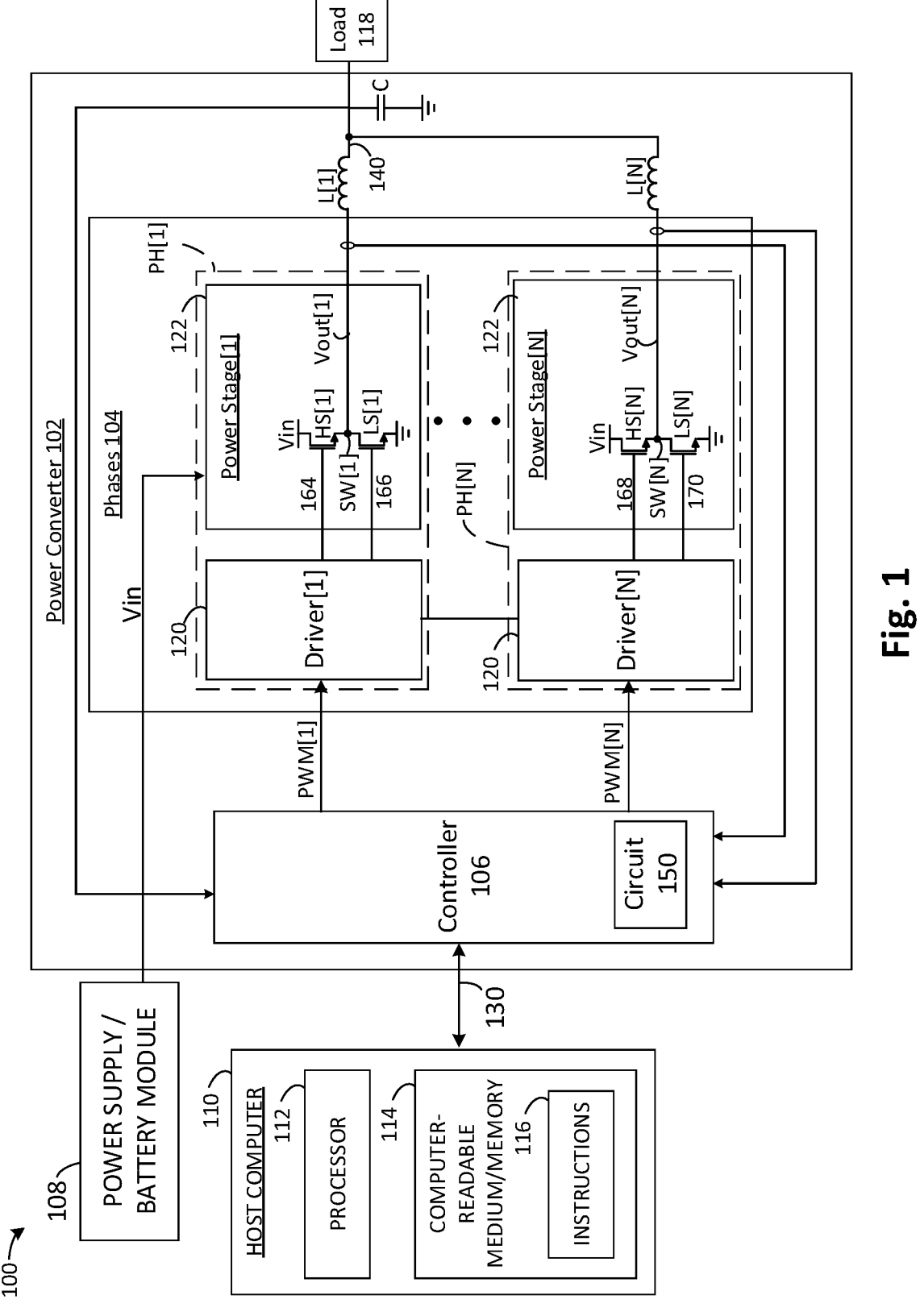
FIG. 1 illustrates an example of a system that can implement a phase addition in power converters in one embodiment.

FIG. 1 illustrates an example of a system that can implement a phase addition in power converters in one embodiment. System 100 can include power converter 102, a power supply 108, host computer 110, and load 118. Host computer 110 can be configured to provide control signals to and receive status information from power converter 102. Power converter 102 may be configured for connection to a power supply 108 such as, e.g., a battery module or a DC power supply to provide a voltage input $V_{in}$ and a current input $I_{in}$. System 100 can be further configured to monitor various parameters relating to operations in system 100 and based on the monitored parameters, determine whether to supply different levels of power to one or more loads, such as a load 118.

Host computer 110 can include a microcontroller or microcomputer having a processor 112 configured to read and execute computer instructions 116 (e.g., computer implemented code) stored on a non-transitory computer-readable medium 114 such as a read-only memory (ROM), a random access memory (RAM), a programmable logic device (PLD), a flash drive, a memory card/stick, a solid-state storage device, or the like which may be re-writable, removable, or replaceable to facilitate revision and/or update of computer instructions 116. Host computer 110 can communicate with power converter 102 over a bidirectional bus 130.

Power converter 102 can include a phases 104 and controller 106. Phases 104 can be configured to include switches that toggle on and off based on control signals provided by controller 106. Controller 106 can include one or more semiconductor devices implementing, for example, a microcontroller including hardware such as various analog and digital circuit components. Controller 106 can include, for example, a processor, central processing unit (CPU), field-programmable gate array (FPGA) or any other circuitry that is configured to control and operate various aspects of power converter 102. Controller 106 be configured to control various aspects of power converter 102. Phases 104 can be included on the same die as controller 106 (e.g., integrated into the same semiconductor chip).

Phases 104 can include multiple phases, e.g., PH[1] to PH[N]. Each phase can include a corresponding driver IC, e.g., driver[1] to driver[N] (herein "driver IC 120"). Each phase can also a power stage, e.g., power stage[1] to power stage[N] (herein "power stages 122"). Each one of power stages 112 can include two switches HS[1] to HS[n] (herein "HS") and LS[1] to LS[n] (herein "LS") connected to an inductor L[1] to L[N] (herein "L"). A corresponding switch node SW[1] to SW[N] (herein "SW") can be in between each HS and LS switch of each power stage 122. Each phase can generate an output voltage $V_{out}[1]$ to $V_{out}[N]$ (herein "$V_{out}$"). The multiple phases can be connected in parallel to deliver different levels of power, such as lower power for light loads and higher power for heavy loads, in a relatively efficient manner. The controller 106 of the power converter 102 can manage the number of active phases based on the load 118 to make the power conversion as efficient as possible. For example, the controller 106 can activate more phases to supply power to a heavy load, and an activate fewer phases, or even only one phase, to supply power to a light load.

Driver IC 120 can drive the switches in power stage 122 via drive signals. Drive signals can be a voltage signal having a gate voltage that can turn on or off their corresponding high-side (HS) and low-side (LS) switches, i.e., HS and LS, of each phase in power stage 122. In one embodiment, HS and LS switches can be field-effect transistors (FETs) such as metal oxide semiconductor field effect transistors (MOSFETs). In other embodiments, HS and LS switches can be diodes or insulated-gate bipolar transistors (IGBTs). Driver IC 120 can include a driver configured to drive HS switch and another driver configured to drive LS switch in power stage 122. Switch HS can be an N-type MOSFET or P-type MOSFET arranged serially between an input voltage Vin and a corresponding switch node and switch LS can be a N-type MOSFET arranged serially between the corresponding switch node SW[1] to SW[N] (herein "SW') and ground. In one embodiment, input voltage Vin can be a direct current (DC) voltage provided by a battery or a power supply. HS switch can be configured to be switched on while LS switch is switched off, and vice versa. When HS switch is switched on and LS switch is switched off, a voltage at a switch node SW between HS switch and LS switch can be pulled up to Vin such that the voltage at the switch node SW is equivalent to Vin. When HS is switched off and LS is switched on, the voltage at the switch node can be pulled down to ground, hence SW is equivalent to zero. The HS and LS switches can be switched on and off to generate output voltage $V_{out}$. Output voltage $V_{out}$ can be outputted to a load 118 through a corresponding inductor L in each phase.

Controller 106 can be configured to execute instructions that may include firmware, software, and configuration data that may be embedded in or accessible by memory or may be at least partially downloaded from host computer 110. Controller 106 can be further configured to generate control signals, e.g., PWM[1] to PWM[N] signals (herein "PWM signals") for turning on and turning off switches in power stages 122.

Using one of the N phases shown in FIG. 1 as an example, phase PH[1] can include a driver IC 120 (e.g., driver[1]) and a power stage 122 (e.g., power stage[1]). Driver IC 120 can use control signals PWM[1] to generate a drive signal 164 and use drive signal 164 to drive switch HS[1] in power stage[1], and can generate a drive signal 166 and use drive signal 166 to drive switch LS[1] in power stage[1]. Driver[1] can apply drive signal 164, 166 to gate terminals of switches HS[1], LS[1], alternately according to PWM control signals provided by controller 106. As a result of driving switches HS[1], LS[1] using drive signal 164, 166, an output voltage $V_{out}$[1] can be output from a switch node SW[1] between switches HS[1], LS[1]. An inductor L[1] having an inductance L1 can be connected between switch node SW1 and output 140 of system 100.

Focusing on phase PH[N] in FIG. 1, phase N can include a driver IC 120 (e.g., driver[N]) and a power stage 122 (e.g., power stage[N]). Driver[N] can use control signals PWM[N] to generate a drive signal 168 and use drive signal 168 to drive switch HS[N] in power stage[N], and can generate a drive signal 170 and use drive signal 170 to drive switch LS[N] in power stage[N]. Driver[N] can apply drive signal 168, 170 to gate terminals of switches HS[N], LS[N], alternately according to PWM control signals provided by controller 106. As a result of driving switches HS[N], LS[N] using drive signal 168, 170, an output voltage $V_{out}$[N] can be output from a switch node SW[N] between switches HS[N], LS[N]. An inductor L[N] having inductance LN can be connected between switch node SW[N] and output 140 of system 100. In one embodiment, the number of phases in power converter 102 can depend on the intended power delivery capabilities of system 100. The number of phases in power converter 102 can vary from 1 to N, where N may be 1, 1, 4, 10, 16, or any number based on the power delivery requirements of system 100.

In an aspect, system 100 can spend a majority of time at light loads with sudden bursts of higher power requirements demanded by various applications. During light loads, power converter 102 can operate relatively less phases, such as one phase, to supply power to the light load. When system 100 requires a higher load, additional number of phases can be added. The number of phases to be added can be dependent on various factors such as average inductor current and efficiency of system 100. However, if the bandwidth of the controller loop is relatively low as compared to the demand of the load 118, and phases are being added relatively slowly, then output voltage undershoot can occur, which may result in performance issues for the load 118. To be described in more detail below, a circuit 150 in controller 106 can support the phase addition during transitions from light loads to heavy loads. Circuit 150 can add a programmable number of pulses to the PWM clock to cause the phase addition to speed up. The phase addition speed up can prevent the output voltage from dropping to the voltage undershoot level before completion of the phase addition. Thus, the transient response during a transient load can be improved and undershoot occurrences can be reduced or avoided.

Figure 2:
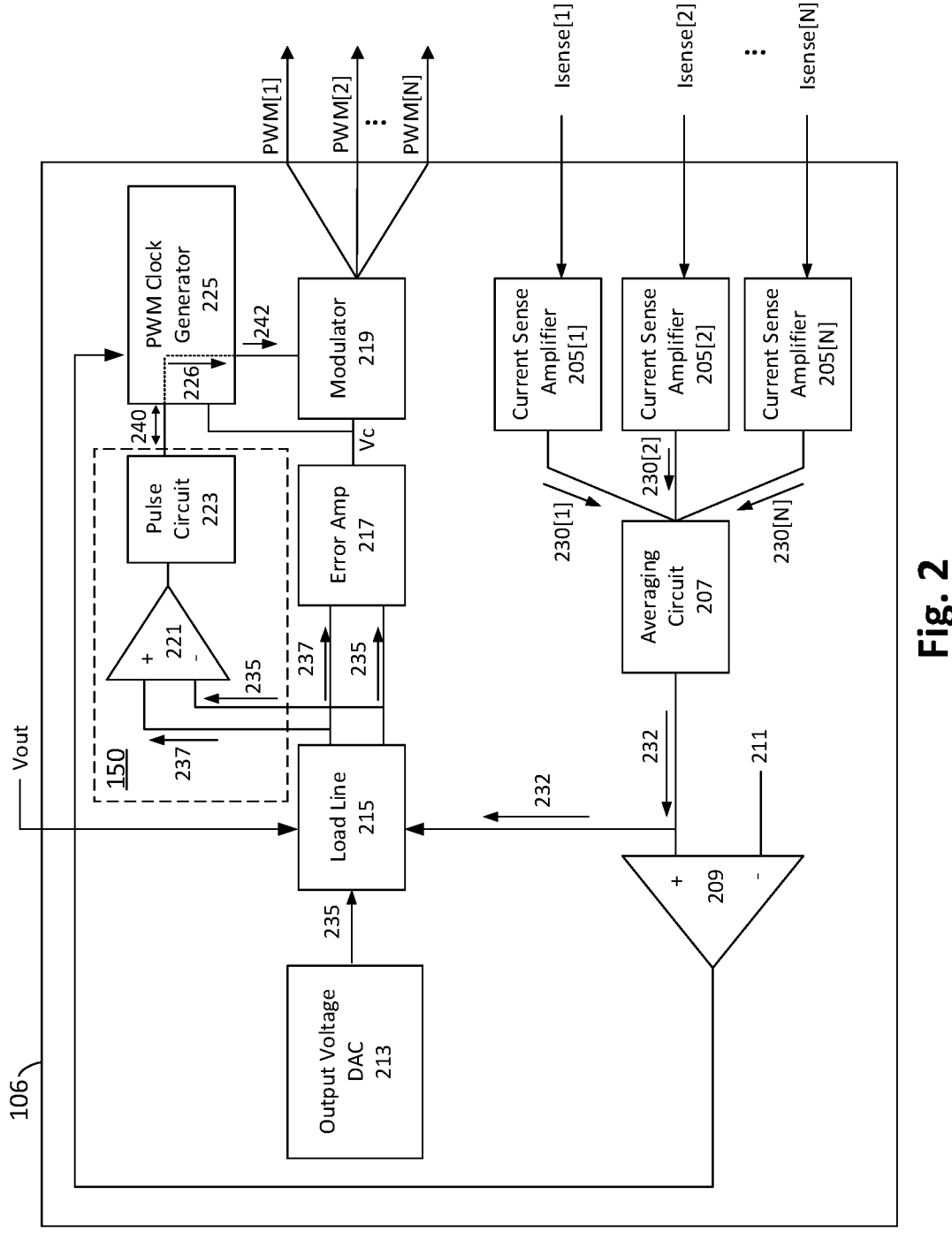
FIG. 2 illustrates a controller that can implement a phase addition in power converters in another embodiment.

FIG. 2 illustrates a controller that can implement a phase addition in power converters in another embodiment. Description of FIG. 2 can reference components that are shown in FIG. 1. In the embodiment shown in FIG. 2, controller 106 can include current sense amplifiers 205[1], 205[2], to 205[N] (herein "205"), an averaging circuit 207, a comparator 209, an output voltage digital to analog converter (DAC) 213, a load line control block 215 ("load line 215"), an error amplifier 217, a modulator 219, a PWM clock generator 225 and circuit 150. Circuit 150 can include a comparator 221 and a pulse generation circuit 223 ("pulse circuit 223"). Each one of current sense amplifiers 205 can be connected to an output of the corresponding phase. Each one of current sense amplifiers 205 can be configured to sense an inductor current, as sensed current Isense, of an inductor connected to the output of a corresponding phase. Current sense amplifiers 205 can be configured to amplify their respective sensed current, Isense[1] to Isense[N], and provide the amplified sensed current 230[1] to 230[N] (herein "amplified sensed current 230"). Amplified sensed currents 230 can be provided to averaging circuit 207. Averaging circuit 207 can be configured to receive and average the amplified sensed currents 230 to generate an averaged current 232. The amplification by current sense amplifiers 205 can allow averaging circuit 207 to determine the average of the sensed currents Isense[1] to Isense[N] with improved accuracy since averaging relatively small currents may be inaccurate at times.

Averaging circuit 207 can provide the averaged current 232 to the non-inverting input (+) of comparator 209 and load line 215. Comparator 209 can be a current comparator configured to compare currents. Comparator 209 can also receive an auto phase add threshold 211 (e.g., in the form of direct current) at the inverting input (−) of comparator 209. Auto phase add threshold 211 can be a predetermined or pre-programmed threshold current value stored in a register of controller 106. Auto phase add threshold 211 can be a programmable threshold that can trigger phase additions to fulfill an increased demand by load 118. By way of example, in response to averaged current 232 being less than auto phase add threshold 211, comparator 209 can output a low voltage or zero voltage, the number of active phases in power converter 102 can remain the same and no additional phases will be activated. In response to averaged current 232 being equal to or greater than auto phase add threshold 211, comparator 209 can output a high voltage and controller 106 can activate additional phases in power converter 102.

Output voltage DAC 213 can be configured to receive a digital signal that is a digital representation of a target voltage and convert the digital representation into an analog signal 235 that encodes the target voltage. The target voltage can be a preprogrammed or predetermined voltage value for zero-load operations. The digital signal can be a predetermined or pre-programmed value of a reference voltage stored in a register of controller 106. Load line 215 can be a circuit configured to perform load line control for power converter 102. Load line 215 can receive analog signal 235 from output voltage DAC 213, averaged current 232, and a feedback of output voltage $V_{out}$. Load line 215 can be configured to store data representing a voltage-current (V-I) relationship (e.g., a V-I curve) that maps different voltage values to current values. Load line 215 can apply the averaged current 232 to the stored V-I relationship to determine a voltage that maps to the averaged current 232. The voltage mapped to averaged current 232 can be combined with $V_{out}$ to generate an adjusted voltage signal 237. In one embodiment, load line 215 can be configured to determine a difference between analog signal 235 and averaged current 232, and multiply the difference with the resistance of load line 215 (e.g., load line resistance $R_{loadline}$) to generate adjusted voltage signal 237. In other words, adjusted voltage signal 237=Vdac−Iload_avg*$R_{loadline}$, where Vdac is the voltage of analog signal 235 and Iload_avg is averaged current 232. Analog signal 235 encoding the target voltage can pass through load line 215 and be provided to error amplifier 217. Load line 215 can send adjusted voltage signal 237 to error amplifier 217. Error amplifier 217 can receive the adjusted voltage signal 237 and analog signal 235, and determine a difference between adjusted voltage signal 237 and analog signal 235. Error amplifier 217 can generate a control voltage Vc based on the difference between adjusted voltage signal 237 and analog signal 235. The control voltage Vc can be provided to modulator 219. Modulator 219 can generate PWM signals PWM[1], PWM [2], to PWM[N](herein "PWM signals") based on the control voltage Vc for each corresponding phase. The current sense amplifiers 205, averaging circuit 207, comparator 209, load line control block 215 and error amplifier 217 can form a voltage control loop that can be implemented by controller 106 to regulate Vout.

PWM clock generator 225 can be a master clock of power converter 102. PWM clock generator 225 can be configured to generate clock signals 226 for synchronizing the PWM signals PWM[1], PWM[2], . . . , PWM[N]. Modulator 219 can receive the clock signals 226 and generate PWM signals in accordance with clock signals 226, such as aligning pulses of the PWM signals with clock signals 226. In one embodiment, PWM clock generator 225 can be included in modulator 219. In one embodiment, modulator 219 can generate PWM signals in accordance with clock signals 226 when circuit 150 is deactivated and can generate PWM signals in accordance with another set of clock signals when circuit 150 is activated. In an example embodiment, when load 118 demands more power from system 100, increasing the current across inductors L to a desired level can take a number of switching cycles (e.g., more than one) to fulfill the demand by load 118. During these number of switching cycles, the output voltage $V_{out}$ can drop relatively rapidly since an output capacitor C (see FIG. 1) starts depleting to supply the load 118.

To prevent $V_{out}$ from dropping to a level that causes voltage undershoot, circuit 150 can be activated (e.g., by controller 106). Comparator 221 in circuit 150 can be configured to monitor and compare, cycle by cycle, the adjusted voltage signal 237 and the analog signal 235 outputted from load line 215. Comparator 221 can generate a low signal, (e.g., low voltage signal or 0 V) if a difference between the adjusted voltage signal 237 and analog signal 235 is less than a predefined difference threshold. Comparator 221 can generate a high signal, (e.g., high voltage signal or 1 V) if the difference between adjusted voltage signal 237 and analog signal 235 is greater than the difference threshold. In one embodiment, the target voltage encoded by analog signals 235 can be greater than adjusted voltage signal 237. Hence, when $V_{out}$ decreases, adjusted voltage signal 237 can also decrease, and the difference between analog signals 235 and adjusted voltage signal 237 can decrease as well. When adjusted voltage signal 237 drops to a predefined N-shot threshold, or when the difference is greater than a predefined difference threshold, comparator 221 can generate a high voltage. The threshold difference can be preprogrammed and adjustable to an optimized value such that if voltage signal 237 is below but near the threshold difference, the comparator 221 can prevent $V_{out}$ from falling below the regulation target. In addition, if voltage signal 237 is above but near the threshold difference, the threshold difference can prevent over correction of $V_{out}$. In an example, the threshold difference can be 20 or 40 mV below the regulation target voltage (e.g., adjusted voltage signal 237). If comparator 221 generates a low signal and outputs the low signal to pulse generation circuit 223, then pulse generation circuit 223 can be deactivated. If comparator 221 generates a high signal and outputs the high signal to pulse generation circuit 223, then pulse generation circuit 223 can be activated.

When pulse generation circuit 223 is activated, pulse generation circuit 223 can be configured to generate at least one clock pulses 240 and the clock pulses 240 can be sent to the PWM clock generator 225. PWM clock generator 225 can be configured to add or insert the clock pulses 240 to the clock signals 226 to generate PWM clock signals 242. The PWM clock signals 242 can be provided to modulator 219. Modulator 219 can generate the PWM signals PWM[1], PWM[2], . . . , PWM[N] based on the PWM clock signals 242. PWM clock signals 242 can have a higher frequency than clock signals 226. Therefore, the addition of clock pulses 240 to clock signals 226 can generate a faster clock (e.g., PWM clock signals 242) and phases can be added at a relatively faster rate to improve the transient response and $V_{out}$ can be regulated at a desired level before voltage undershoot occurs.

In one embodiment, pulse generation circuit 223 can include a counter that can be programmable. The counter can be programmed with a predefined number of clock pulses. The counter in pulse generation circuit 223 can be configured to count the number of clock pulses 240 being generated by the pulse generation circuit 223. When the number of clock pulses 240 reaches the predefined number of clock pulses, pulse generation circuit 223 can stop generating clock pulses 240. If pulse generation circuit 223 stops providing clock pulses 240 to PWM clock generator 225, then PWM clock generator 225 can continue to generate clock signals 226 and modulator 219 can generate PWM signals based on clock signals 226. Depending on the number of phases available in system 100, the amount of pulses generated can be preprogrammed. In one example embodiment, the number of clock pulses 240 being added can be between 1 to 4 clock pulses 240. However, in a slower system (e.g., higher inductor values and larger output capacitors), a larger number of clock pulses 240 may be desired. In another embodiment, when all phases are added in power converter 102 (e.g., all N phases are active), pulse generation circuit 223 can stop generating clock pulses 240. By way of example, controller 106 can determine that all N phases are active if all N current sense amplifiers 205 receive sensed current. Controller 106 can send a signal to pulse generation circuit 223 to indicate that all N phases are active and to disable or to deactivate pulse generation circuit 223 to stop generation of pulses 240.

PWM clock generator 225 can also be triggered to turn on or turn off the combination of clock pulses 240 to clock signals 226 based on the output of comparator 209. By way of example, if comparator 209 outputs a low signal, the combination of clock pulses 240 with clock signals 226 can be deactivated in PWM clock generator 225 regardless of whether pulse generation circuit 223 is outputting clock pulses 240 or not. If comparator 209 outputs a high signal, the combination of clock pulses 240 with clock signals 226 can be activated in PWM clock generator 225. If the output from comparator 209 activates the combination of clock pulses 240 with clock signals 226 and pulse generation circuit 223 does not output any clock pulses 240, then PWM clock generator 225 can add zero to clock signals 226 and output clock signals 226 as PWM clock signals 242. Circuit 105 can be configured to determine the number of active and inactive phases, and to determine which inactive phases to be turned on when load 118 demands more power. By way of example, the controller 106 can determine the number of current sense amplifiers 205 that are receiving sensed currents to determine the number of active phases and inactive phases.

Figure 3:
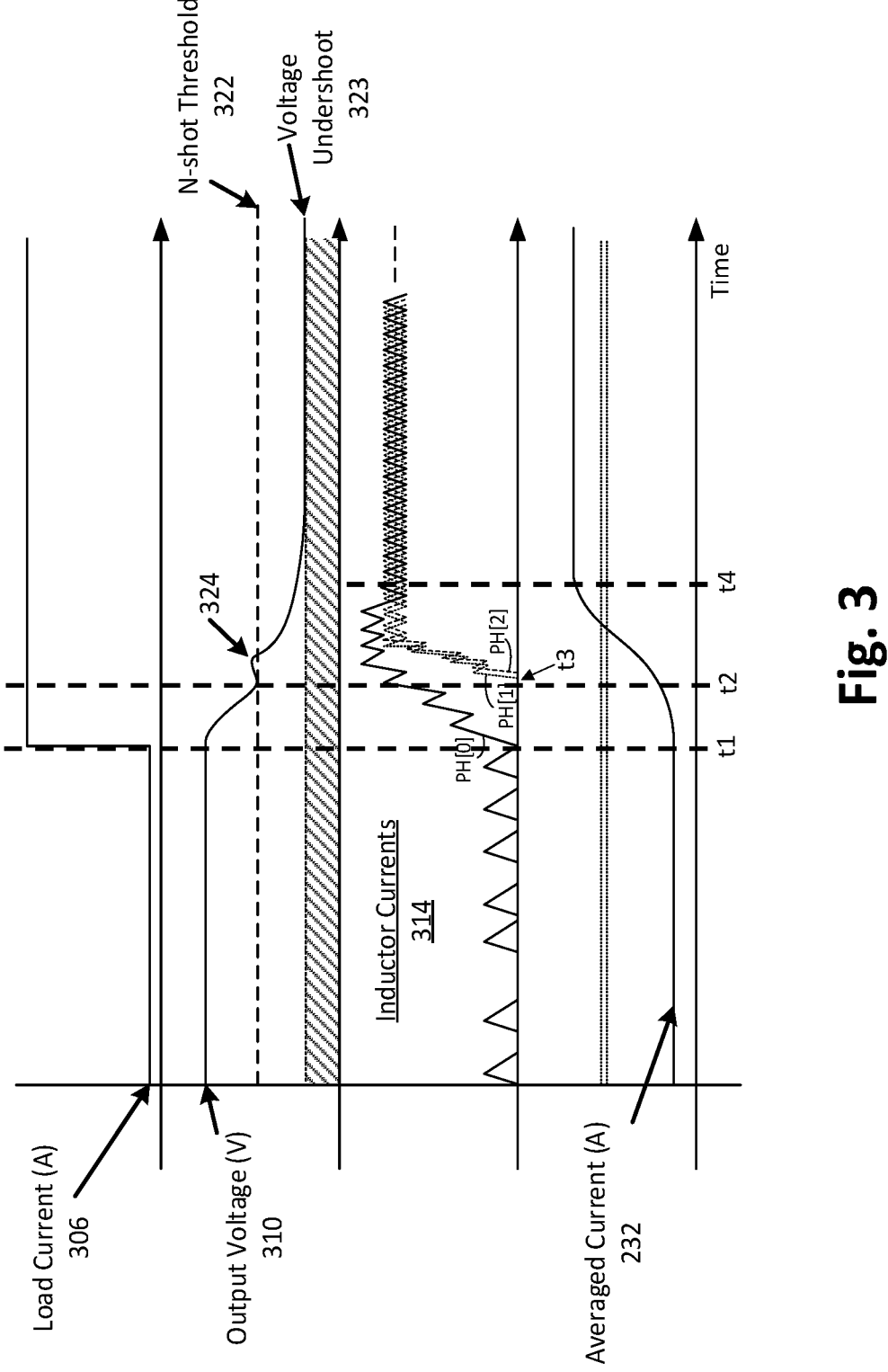
FIG. 3 illustrates a set of waveforms resulting from an implementation of a phase addition in power converters in another embodiment.

FIG. 3 illustrates a set of waveforms resulting from an implementation of a phase addition in power converters in another embodiment. Descriptions of FIG. 3 may reference components shown in FIGS. 1-2. Waveforms of a load current 306 being drawn by load 118, inductor currents 314 of one or more phases in power converter 102, such as phases PH[0], PH[1] and PH[2], averaged current 232 generated by the averaging circuit 207, and output volage 310 (e.g., $V_{out}$) are shown in FIG. 3. At a time t1, load 118 demands more power, thus load current 306 steps up at time t1. Averaged current 232 may take a number of switching cycles to increase to the same current as load current 306. In addition, the output voltage 310 can begin to decrease at time t1 since the output capacitor C is depleting the voltage to supply the load 118. At time t1, power converter 102 has one phase PH[0] activated. Comparator 221 can generate a low signal, keeping the pulse generation circuit 223 deactivated. When the output voltage 310 reaches an N-shot threshold 322 at time t2, comparator 221 can generate a high signal, activating the pulse generation circuit 223 to generate clock pulses 240 that can be combined with clock signals 226 to generate PWM clock signals 242. The PWM signals generated by modulator 219 based on PWM clock signals 242 can activate phase PH[1] at a time t3 and another phase PH[2] shortly after time t3. The addition of phases PH[1] and PH[2] can cause output voltage 310 to increase, as shown by a peak 324, before output voltage 310 continue to decrease. As a result of adding phases at time t3 to increase output voltage 310 as shown by peak 324, output voltage 310 can continue to decrease until the averaged current 232 reaches the same level as the load current 306 without falling into a voltage undershoot region 323. In one embodiment, if circuit 150 is deactivated and modulator 219 generates PWM signals according to clock signals 226, then the time to begin adding phases may be later than time t3, the peak 324 of output voltage 310 will not occur and the output voltage 310 will drop into the voltage undershoot region 323.

Figure 4:
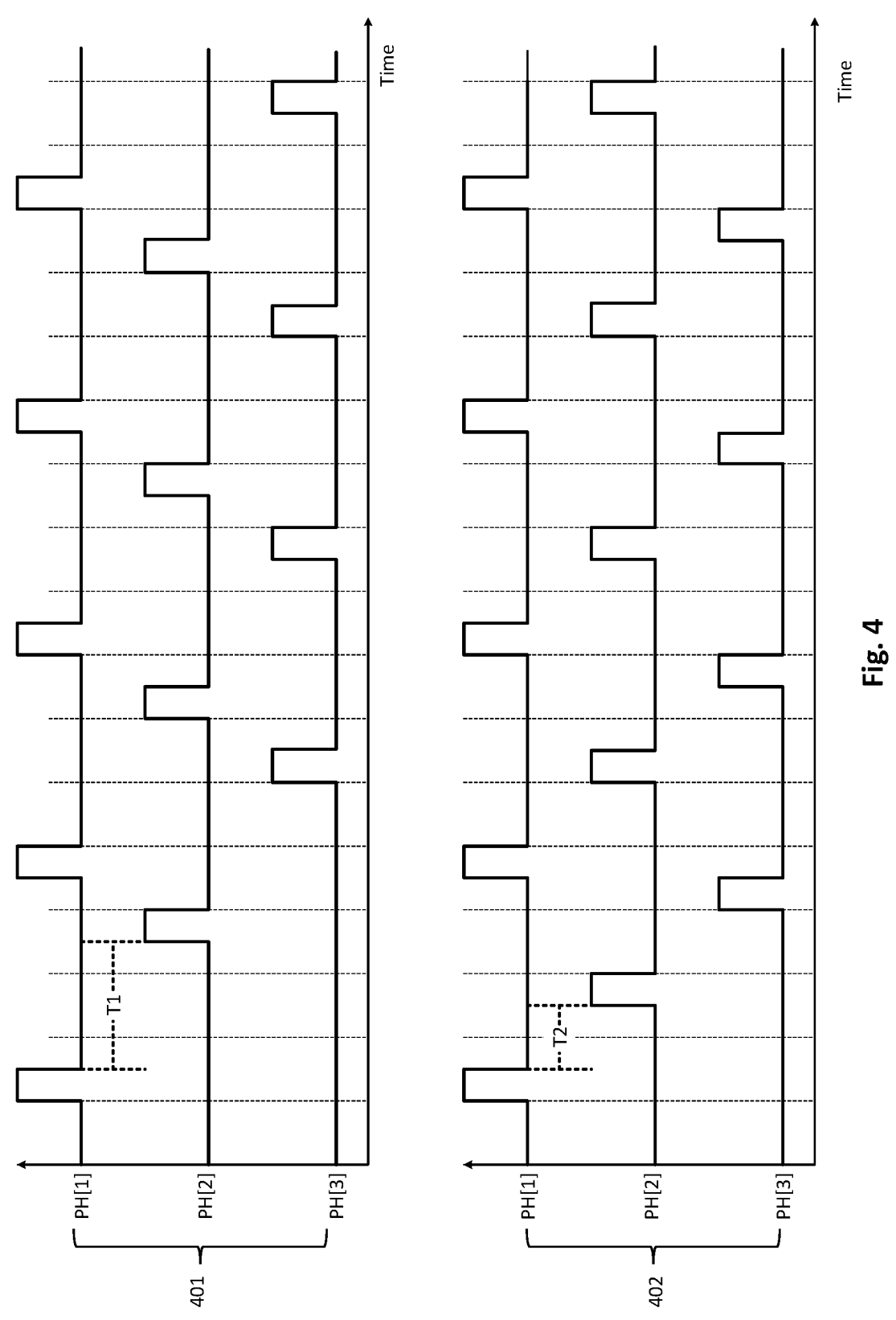
FIG. 4 illustrates clock signals resulting from different implementations of the system shown in FIG. 1 in one embodiment.

FIG. 4 illustrates clock signals resulting from different implementations of the system shown in FIG. 1 in one embodiment. Descriptions of FIG. 4 can reference components shown in FIG. 1 to FIG. 3. Waveform diagram 401 illustrates an implementation of FIG. 1 when circuit 150 is disabled. Waveform diagram 402 illustrates an implementation of FIG. 1 when circuit 150 is enabled. In an example embodiment, power converter 102 can include at least three phases. When system 100 requires a higher load current, phases 2 and 3, i.e., PH[2] and PH[3] are added in addition to the already active phase 1, i.e., PH[1] to help supply more power to the load 118. In waveform diagram 401, a new phase PH[k] can be added at a time T1 after the falling edge of the phase PH[k−1]. For example, the rising edge of the phase PH[2] begins at time T1 after the falling edge of the phase PH[1]. Another phase PH[k+1] is added after another lapse of time T1 after the falling edge of the phase PH[k]. In the example embodiment shown in waveform diagram 402, circuit 150 of system 100 is enabled to implement phase additions at a faster rate than with circuit 150 disabled. In waveform diagram 402, phase PH[2] is added at a time T2 after the falling edge of the phase PH[1] and phase PH[3] is added at another lapse of time T2 after the falling edge of phase PH[2]. As shown in FIG. 4, when circuit 150 is enabled, phases can be added at a faster time due to time T2 being less than time T1. Time T2 can be less than Time T1 due to the combination of clock pulses 240 with clock signals 226 (e.g., generation of PWM clock signals 242) in response to the activation of circuit 150.

FIG. 5 is a flow diagram illustrating a method for operating a fast clock and phase add system for a multiphase power converter, in accordance with various examples. Descriptions of FIG. 5 may reference components shown in FIGS. 1-4. The process 500 can include one or more operations, actions, or functions as illustrated by one or more of blocks 501, 503, 505, and 507. Although illustrated as discrete blocks, various blocks can be divided into additional blocks, combined into fewer blocks, eliminated, performed in different order, or performed in parallel, depending on the desired implementation.

Process 500 can be implemented by a controller in a voltage regulator system. For example, controller 106 of voltage regulator system 100 can perform process 500. Process 500 can begin at block 501. At block 501, the controller can generate first clock signals. The process 500 can continue from block 501 to block 503. At block 503, the controller can generate pulse width modulation (PWM) signals in accordance with the first clock signals to operate a first number of active phases in a multiphase power converter to supply power to a load.

The process 500 can continue from block 503 to block 505. At block 505, the controller can determine that the load demands a second number of active phases in the multiphase power converter to supply the power. The second number is greater than the first number.

The process 500 can continue from block 505 to block 507. At block 507, the controller can generate at least one pulse signal. The process 500 can continue from block 507 to block 509. At block 509, the controller can combine the at least one pulse signal with the first clock signals to generate second clock signals. The second clock signals have a higher frequency than the first clock signals.

The process 500 can continue from block 509 to block 511. At block 511, the controller can generate the PWM signals in accordance with the second clock signals to operate the second number of active phases in the multiphase power converter to supply power to the load. In one embodiment, the controller can determine that an average inductor current of the multiphase power converter is greater than a predefined threshold. In response to determining the average inductor current of the multiphase power converter is greater than the predefined threshold, the controller can determine that the load demands the second number of active phases in the multiphase power converter to supply the power. In another embodiment, in response to determining the load demands the second number of active phases, the controller can determine that an output voltage of the multiphase power converter decreases to a predefined threshold. In response to determining the output voltage decreased to the predefined threshold, the controller can generate the at least one pulse signal.

In another embodiment, the controller can count a number of pulses generated among the at least one pulse signal. The controller can further determine that the number of pulses generated reaches a predefined count. In response to determining the number of pulses generated reaches the predefined count, the controller can stop the generation of the at least one pulse signal. In another embodiment, the controller can stop generation of the at least one pulse signal. In response to stopping generation of the at least one pulse signal, the controller can generate the PWM signals in accordance with the first clock signals to operate the second number of active phases in the multiphase power converter to supply power to the load. In another embodiment, the controller can determine that all phases in the multiphase power converter are active. In response to all phases in the multiphase power converter being active, the controller can stop generation of the at least one pulse signal.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
a clock generator configured to generate first clock signals;
a modulator configured to generate pulse width modulation (PWM) signals in accordance with the first clock signals to operate a first number of active phases in a multiphase power converter to supply power to a load; and
a circuit configured to:
  determine that the load demands a second number of active phases in the multiphase power converter to supply the power, wherein the second number is greater than the first number;
  generate at least one pulse signal; and
  send the at least one pulse signal to the clock generator,
wherein the clock generator is further configured to combine the at least one pulse signal with the first clock signals to generate second clock signals, wherein the second clock signals have a higher frequency than the first clock signals, and
wherein the modulator is further configured to generate the PWM signals in accordance with the second clock signals to operate the second number of active phases in the multiphase power converter to supply power to the load.

2. The semiconductor device of claim 1, wherein the circuit is configured to:
receive a signal that indicates an average inductor current of the multiphase power converter is greater than a predefined threshold; and
in response to receipt of the signal, determine that the load demands the second number of active phases in the multiphase power converter to supply the power.

3. The semiconductor device of claim 1, wherein the circuit is configured to:
in response to determination that the load demands the second number of active phases, determine that an output voltage of the multiphase power converter decreases to a predefined threshold; and
in response to the output voltage decreased to the predefined threshold, generate the at least one pulse signal.

4. The semiconductor device of claim 1, wherein the circuit is further configured to:
count a number of pulses generated among the at least one pulse signal;
determine that the number of pulses generated reaches a predefined count; and
in response to determination that the number of pulses generated reaches the predefined count, stop the generation of the at least one pulse signal.

5. The semiconductor device of claim 1, wherein:
the circuit is configured to stop generation of the at least one pulse signal; and
in response to the circuit stopped generation of the at least one pulse signal, the modulator is configured to generate the PWM signals in accordance with the first clock signals to operate the second number of active phases in the multiphase power converter to supply power to the load.

6. The semiconductor device of claim 1, wherein the circuit is configured to:
receive a signal indicating that all phases in the multiphase power converter are active; and
in response to receipt of the signal indicating that all phases in the multiphase power converter are active, stop generation of the at least one pulse signal.

7. The semiconductor device of claim 1, wherein the clock generator is configured to:

receive the at least one pulse signal from the circuit;

receive a signal that indicates an average inductor current of the multiphase power converter is less than a predefined threshold; and in response to receipt of the signal, deactivate the combination of the at least one pulse with the first clock signals.

8. A system comprising:

a multiphase power converter configured to convert an input voltage into an output voltage to supply power to a load; and a controller configured to:

generate first clock signals;

generate pulse width modulation (PWM) signals in accordance with the first clock signals to operate a first number of active phases in the multiphase power converter to supply power to a load;

determine that the load demands a second number of active phases in the multiphase power converter to supply the power, wherein the second number is greater than the first number;

generate at least one pulse signal;

combine the at least one pulse signal with the first clock signals to generate second clock signals, wherein the second clock signals have a higher frequency than the first clock signals; and generate the PWM signals in accordance with the second clock signals to operate the second number of active phases in the multiphase power converter to supply power to the load.

9. The system of claim 8, wherein the controller is configured to:

determine that an average inductor current of the multiphase power converter is greater than a predefined threshold; and in response to determination that the average inductor current of the multiphase power converter is greater than the predefined threshold, determine that the load demands the second number of active phases in the multiphase power converter to supply the power.

10. The system of claim 8, wherein the controller is configured to:

in response to determination that the load demands the second number of active phases, determine that an output voltage of the multiphase power converter decreases to a predefined threshold; and in response to the output voltage decreased to the predefined threshold, generate the at least one pulse signal.

11. The system of claim 8, wherein the controller is further configured to:

count a number of pulses generated among the at least one pulse signal;

determine that the number of pulses generated reaches a predefined count; and in response to determination that the number of pulses generated reaches the predefined count, stop the generation of the at least one pulse signal.

12. The system of claim 8, wherein the controller is configured to:

stop generation of the at least one pulse signal; and in response to the stopped generation of the at least one pulse signal, generate the PWM signals in accordance with the first clock signals to operate the second number of active phases in the multiphase power converter to supply power to the load.

13. The system of claim 8, wherein the controller is configured to:

determine that all phases in the multiphase power converter are active; and in response to all phases in the multiphase power converter being active, stop generation of the at least one pulse signal.

14. The system of claim 8, wherein the controller is configured to:

determine an average inductor current of the multiphase power converter is less than a predefined threshold; and in response to the average inductor current of the multiphase power converter being less than a predefined threshold, deactivate the combination of the at least one pulse signal with the first clock signals.

15. A method comprising:

generating first clock signals;

generating pulse width modulation (PWM) signals in accordance with the first clock signals to operate a first number of active phases in a multiphase power converter to supply power to a load;

determining that the load demands a second number of active phases in the multiphase power converter to supply the power, wherein the second number is greater than the first number;

generating at least one pulse signal;

combining the at least one pulse signal with the first clock signals to generate second clock signals, wherein the second clock signals have a higher frequency than the first clock signals; and generating the PWM signals in accordance with the second clock signals to operate the second number of active phases in the multiphase power converter to supply power to the load.

16. The method of claim 15, further comprising:

determining that an average inductor current of the multiphase power converter is greater than a predefined threshold; and in response to determining the average inductor current of the multiphase power converter is greater than the predefined threshold, determining that the load demands the second number of active phases in the multiphase power converter to supply the power.

17. The method of claim 15, further comprising:

in response to determining the load demands the second number of active phases, determining that an output voltage of the multiphase power converter decreases to a predefined threshold; and in response to determining the output voltage decreased to the predefined threshold, generating the at least one pulse signal.

18. The method of claim 15, further comprising:

counting a number of pulses generated among the at least one pulse signal;

determining that the number of pulses generated reaches a predefined count; and in response to determining the number of pulses generated reaches the predefined count, stopping the generation of the at least one pulse signal.

19. The method of claim 15, further comprising:

stopping generation of the at least one pulse signal; and in response to stopping generation of the at least one pulse signal, generating the PWM signals in accordance with the first clock signals to operate the second number of active phases in the multiphase power converter to supply power to the load.

20. The method of claim 15, further comprising:
determining that all phases in the multiphase power converter are active; and
in response to all phases in the multiphase power converter being active, stopping generation of the at least one pulse signal.

\* \* \* \* \*